(No Model.)
T. F. COLIN.
PROCESS OF MAKING CYANIDS AND AMMONIA.
No. 598,195. Patented Feb. 1, 1898.
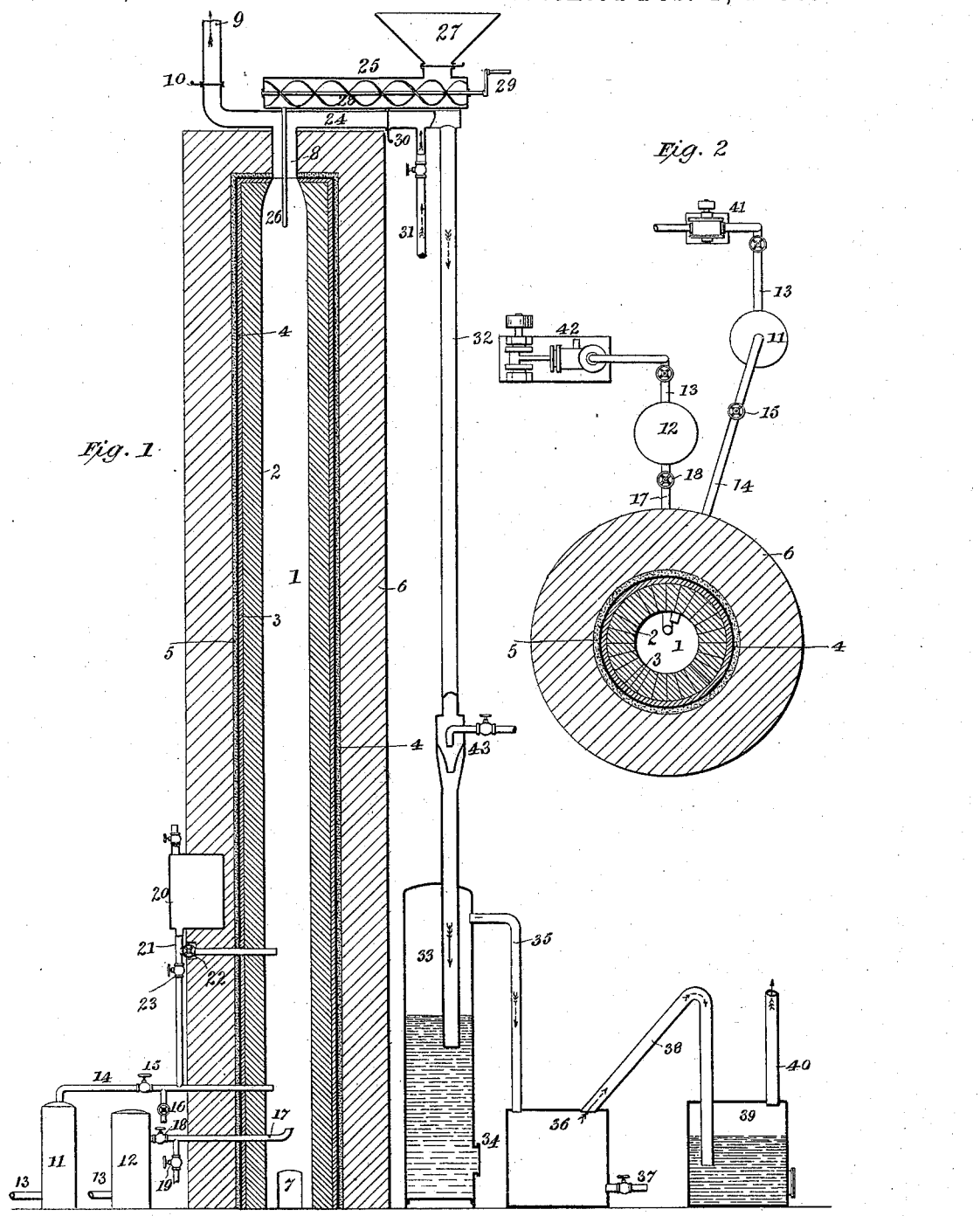
Witnesses:
Theodore F. Colin Inventor
by Kerr & Curtis
Attorneys

UNITED STATES PATENT OFFICE.

THEODORE F. COLIN, OF PITTSBURG, PENNSYLVANIA.

PROCESS OF MAKING CYANIDS AND AMMONIA.

SPECIFICATION forming part of Letters Patent No. 598,195, dated February 1, 1898.

Application filed August 1, 1891. Serial No. 401,415. (No specimens.)

*To all whom it may concern:*

Be it known that I, THEODORE F. COLIN, a citizen of the United States, and a resident of Pittsburg, in the county of Allegheny and State of Pennsylvania, have invented a new and Improved Process of Making Cyanids of the Alkalies and Producing Ammonia Therefrom, of which I declare the following to be a full, clear, and exact description, reference being had to the accompanying drawings, forming a part of this specification.

The object of my invention is the production of cyanids of the alkalies or alkaline earths and their subsequent conversion into ammonia. The cyanid is produced from the free nitrogen of the air by bringing it into intimate contact at a high temperature in a closed vessel with carbon and alkali, and it is then converted into ammonia by the action of steam. The conditions necessary for successive and continuous operation of this way of making ammonia have been variously stated before and many efforts have been made to apply them, but such efforts have been attended with only limited practical success. The conditions referred to are: the time given to the various steps, the temperature, the character and proportions of the mixture of the materials and agents used, the relative places of introduction of the same, and the presence or absence of certain gases in the mixture. The particular conditions to which my invention is directed are the amount of heat liberated and absorbed and the influence of pressure in the operation.

Some of the reactions taking place in the furnace or retort during the production of cyanids develop heat, while others absorb it. If the furnace has been previously sufficiently heated, the formation of cyanids will proceed for a short time until the heat stored up in the furnace is absorbed and the temperature falls too low for a proper reaction. I strive to obviate this difficulty and save the heat as much as possible by eliminating sources of loss and employing materials which react at low temperatures. For the first purpose I construct my furnace sufficiently small and of such materials and in such form that the loss of heat by radiation and convection shall be minimized, and for the second purpose I superheat the air and fuel-gas employed for the production of heat before they enter the furnace, and I also heat the materials used before they are introduced into the furnace. As the dissociation of coal and coke into molecules absorbs a large part of the heat they produce, I prefer to use a volatile hydrocarbon which is easily dissociated and which, as before stated, is previously heated as much as possible before it is admitted to the furnace. The alkali, which is comminuted or ground to a fine powder, is heated before entering the furnace, and is then further heated by falling through the upward stream of incandescent gas before entering its proper zone of reaction. Proper attention is also paid to selecting such materials as will dissociate at the lowest temperature.

The proper formation of cyanids requires a high temperature—say about 1,000° centigrade—but the reaction of the steam upon the cyanids does not require more than 500° centigrade. It is important, therefore, to maintain the higher temperature mentioned in the furnace; but it is a matter of economy to quickly reduce the temperature of the escaping gases to about the lower degree mentioned as they leave the furnace, and this I accomplish by means of a valve or gate placed in the exit-pipe between the furnace and the point at which the steam is applied, and, if necessary, to this end I can employ additional suction—as, for instance, by means of a steam-jet exhaust 43, placed in the pipe 32.

An important factor in my improved process is the use of a high pressure in the furnace. I am aware that the use of pressure has been suggested, but it was only as a means to force the gases through the furnace or retort and amounted to only a few inches of water, as beyond this the apparatus heretofore used was not strong enough to permit of the carrying of the higher pressure contemplated by me. The use of such higher pressure—say one pound or over—enables me to keep up a very high temperature, facilitates an intimate mixture of the reagents and better and more thorough reactions, saves time in the operation, and enables me to instantly reduce the temperature to the point required in the subsequent step of the process.

To enable others skilled in the art to make use of my invention, I will now describe it by reference to the accompanying drawings of the apparatus, in which—

Figure 1 is a vertical section of such parts of the plant as it is necessary to show, and Fig. 2 is a cross-section of the furnace.

The furnace 1 is a high vertical stack having walls of great thickness and strength. The inner lining 2 is composed of fire-brick and is inclosed in a strong iron jacket 4, between which and the lining 2 is a layer 3 of fire-clay. The thick outer structure 6 is composed of common bricks, and between it and the iron casing is an annular space 5, which is filled with a fine dry sand. At the lower end of this stack is an opening 7, closed by a suitable door, through which the heavier particles of the alkaline dust which fall to the bottom of the furnace can be removed from time to time. At the upper end of the stack is a throat or contracted opening 8, lined by an extension of the iron jacket 4 and connected with a flue or chimney 9, which is provided with a suitable slide-valve or damper 10. At the side of the stack are gas and air heaters 11 and 12, of any suitable construction, for giving the required temperature to the gas and air which is used for combustion. These heaters are connected by means of pipes 13 with suitable reservoirs containing compressed gas and air or with suitable gas and air compressing machines, (see 41 and 42, Fig. 2,) whereby the gas and air can be applied to the furnace at any desired pressure, it being understood that for the purpose of my invention the degree of such pressure shall be relatively high. The gas-heater 11 is connected with the furnace by means of a pipe 14, controlled by a valve 15, and having a side pipe 16, with a suitable valve connected with the gas-supply for the purpose of supplying fuel for the preliminary heating of the furnace in case it is to admit the gas for such purpose without superheating. The air-heater 12 is in like manner connected with the furnace by means of a pipe 17, controlled by a valve 18, and having a pipe 19 opening into the atmosphere also controlled by a suitable valve. A tank 20 for containing a liquid hydrocarbon is also provided and is preferably built into the wall of the stack, so that the hydrocarbon contained therein may be heated to the proper temperature by the heat of the stack. This tank is connected with the furnace by means of a pipe 21 and branch pipe 22, which latter is controlled by a suitable valve, and for convenience the pipe 21 is extended down to and connected with the gas-pipe 14 and is controlled by a separate valve 23. This construction enables the oil or other hydrocarbon to be admitted to the gas-pipe and injected into the furnace by the pressure at which the gas is supplied.

The throat 8 of the furnace opens into the horizontal pipe 24, on the top of which is placed a cylinder 25, having a tube or pipe 26 leading directly down into the furnace. At one end of the cylinder 25 is a hopper 27, in which the pulverized alkali or alkaline earth is placed, and in the cylinder is a conveying-screw 28, operated by a crank 29 or other power devices attached to its shaft for the purpose of feeding the alkali forward from the hopper 27 into the pipe 26 and delivering the same in a uniform manner. The pipe 24 is provided with a gate-valve 30, placed between the throat 8 and the steam-pipe 31, which opens into the pipe 24 and is controlled by a suitable valve, as shown. The steam-pipe 31 is supplied with steam of the proper temperature and pressure from a suitable steam boiler or generator, as will be understood without further description. Extending from the end of the pipe 24 to the washer 33 is a pipe 32, the lower end of which extends below the surface of the water contained therein. The tank or washer 33 is provided with an opening at its lower end, closed by a suitable cover or door 34, and is connected by a pipe 35, leading from its upper end, with a condensing tank or vessel 36, and the latter is in turn connected with the absorber. The condenser 36 is provided with an opening at its base controlled by a suitable cock 37, as shown. A pipe 38 leads from this upper end by a return-bend into the absorbing tank or vessel 39, terminating below the surface of the liquid contained therein. This vessel contains an acid, which is indicated by the parallel lines, and is designed to retain the ammonia and to permit the balance of the gases which are of an inflammable character to pass off through the tube 40, by which, if desired, they may be led by a suitable pipe to the heaters 11 and 12 or to other place to be used for heat-producing purposes.

The operation of my improvement is as follows: The high vertical furnace 1, having a comparatively small internal diameter, is first heated by means of some suitable fuel-gas—such as water, generator, or natural gas—supplied from the pipe 16, the air necessary for combustion being supplied by the pipe 17. During this period the gate-valve 30 is closed and the valve 10 is opened, so that the products of combustion may escape into the chimney or flue 9. When the temperature of the furnace has risen to about 1,200° centigrade, it is in condition for operation. Then the valve 10 is closed and the valve 30 opened partly and air and fuel-gas at full high pressure, as described, are forced through the heaters 11 and 12 and into the furnace, the pressure being as high as the construction of the furnace will permit and the proportions of gas and air so regulated as to secure a proper combustion. The oil or liquid hydrocarbon, having been previously heated as much as possible without danger of decomposition or combustion, is then admitted into the furnace from the tank 20 by means of pipes 21 and 22. The oil on entering the hot furnace is decomposed and partly burned, such combustion using up the remainder of the free oxygen in the furnace and producing an excess of carbon, which causes a large volume of smoky flame containing carbon in an incandescent condition. This flame passing upward meets with a shower of heated finely-divided alkali delivered into the furnace from the hopper 27 by means of the conveyer 28 through the cylinder 25 and pipe 26. This alkali (which may be an oxid, hydroxid, or carbonate of an alkali or alkaline earth) is heated, as before described, before being delivered into the furnace, and when so delivered is further heated by falling through the incandescent gases in the upper part of the furnace, where the temperature is too low for a good reaction. On reaching the middle section or zone of the furnace, where the temperature is much higher, it enters into combustion with the incandescent carbon and nitrogen and produces cyanids. It is advisable in order to obtain the maximum effect to make the furnace very tall, so that the zone of this reaction be comparatively long. The finely-powdered alkali and the cyanids are carried out of the throat of the furnace into the pipe 24, where they meet with a current of steam from the steam-pipe 31, which breaks up the cyanid and forms ammonia. This reaction requires a temperature not exceeding 500° centigrade, and in order to cool the incandescent gases down to that temperature rapidly and in a short space I keep the gate-valve 30 partly shut and preserve a high temperature in the furnace, thereby facilitating the reactions occurring therein and permitting the gases on passing the gate-valve 30 to expand to a few inches of water-pressure, so as to lower their temperature to the required degree at once. The gases and solids pass down through the pipe 32 into the washer 33, where any undecomposed cyanids are finally destroyed and the solids are washed out by the water and settle to the bottom of the tank, from which the alkali is withdrawn from time to time and again prepared for the same use. From the washer 33 the gases, containing a considerable amount of steam, which would too greatly dilute the acid in the absorber 39, pass through the cooling-pipes 35 and 38, connected with the condenser 36, where most of the steam is condensed. The water of condensation which collects in the condenser 36 absorbs a part of the ammonia and can be worked up into aqua-ammonia. The gases then pass into the absorber 39, which is of any desired size and shape and contains a suitable acid, which retains the ammonia, and the balance of the gases, being separated therefrom and being suitable only for fuel, are led off by means of the pipe 40 and permitted to escape, or, if desired, are conducted to a furnace or furnaces and used for heating purposes, such as heating the gas and air chambers 11 and 12 or raising steam in the boiler.

What I claim as my invention is—

1. In the process herein described of producing cyanids and ammonia, the introduction directly and separately into a closed alkali-furnace of highly-heated air and fuel-gas; substantially as and for the purposes described.

2. In the process herein described of producing cyanids and ammonia, the introduction directly and separately into a closed alkali-furnace of air and fuel-gas under pressure; substantially as and for the purposes described.

3. In the process herein described of producing cyanids and ammonia, the introduction directly into an alkali-furnace of highly-heated air and fuel-gas under pressure and the introduction above or into the flame thus produced of a liquid hydrocarbon; substantially as and for the purposes described.

4. In the process herein described of producing cyanids and ammonia, the introduction directly into an alkali-furnace of air and fuel-gas under pressure, the introduction of a volatile hydrocarbon into the flame thus produced and the introduction of a shower or stream of finely-powdered alkali or alkaline earth so as to meet and mingle with the ascending current of incandescent gases; substantially as and for the purposes described.

5. In the process herein described of producing cyanids and ammonia, the introduction directly into a closed alkali-furnace of air, gas, oil and alkali, one after another at successively higher points for the purpose of utilizing the motion and heat from each reaction for the heating up and preliminary dissociation of the material for the next one; substantially as and for the purposes described.

6. In the production of cyanids and ammonia, the method herein described of introducing the powdered heated alkali or alkaline earth into the closed alkali-furnace, which consists in first heating the same outside of the furnace and then discharging it directly into the furnace in a heated condition; substantially as and for the purposes described.

7. In the process herein described for producing cyanids and ammonia, the introduction directly and separately into the alkali-furnace of highly-heated gas and air, heated hydrocarbon and heated alkali; substantially as and for the purposes described.

8. The process of producing cyanids and ammonia consisting of the following successive steps effected in the same closed alkali-furnace; first, the combustion of air and gas; second, the dissociation of a liquid hydrocarbon; and third, the dissociation of an alkali and the formation of the cyanids; in combination with the decomposition of the cyanids by steam at a point outside of the furnace; substantially as and for the purposes described.

In testimony whereof I have hereunto set my hand this 28th day of July, 1891.

THEODORE F. COLIN.

Witnesses:
THOMAS B. KERR,
FRANK MOORE.